United States Patent [19]

Dunchock

[11] Patent Number: 4,867,465
[45] Date of Patent: Sep. 19, 1989

[54] STORAGE RACK

[75] Inventor: Richard S. Dunchock, South Laguna, Calif.

[73] Assignee: Troy Marketing Corporation, Troy, Mich.

[21] Appl. No.: 220,992

[22] Filed: Jul. 13, 1988

Related U.S. Application Data

[63] Continuation of Ser. No. 58,254, Jun. 4, 1987, abandoned, which is a continuation-in-part of Ser. No. 929,675, Nov. 12, 1986, abandoned.

[51] Int. Cl.⁴ .................................................. B62B 3/10
[52] U.S. Cl. ..................................... 280/79.3; 280/79.7; 296/103; D34/17
[58] Field of Search .......... 280/47.34, 79.1 R, 7.91 A, 280/79.3; D34/17; 296/103, 107, 218

[56] References Cited

U.S. PATENT DOCUMENTS

| D. 232,625 | 9/1974 | Shiflet | D34/17 |
|---|---|---|---|
| D. 237,597 | 11/1975 | Clarke et al. | D34/17 |
| D. 265,517 | 7/1982 | Dunchock | D34/17 |
| D. 288,739 | 3/1987 | Johnson, Jr. et al. | D34/17 |
| 402,340 | 4/1889 | Martin | 280/43.24 |
| 1,441,264 | 1/1923 | Bruewer | 206/335 |
| 2,377,023 | 5/1945 | Milburn et al. | 248/119 |
| 2,466,149 | 4/1949 | Burg | 280/57 |
| 2,681,233 | 6/1954 | Smith | 280/79.3 |
| 2,746,791 | 5/1956 | Gosselin | 296/107 |
| 2,886,339 | 5/1959 | Buttles | 280/79.3 |
| 2,916,293 | 12/1959 | Lang | 280/79.3 |
| 2,980,438 | 4/1961 | Baer | 280/79.3 |
| 3,224,787 | 12/1965 | Anderson | 280/33.99 |
| 3,540,753 | 11/1970 | Hanson | 280/47.34 |
| 3,693,996 | 9/1972 | Hardy | 280/47.34 |
| 3,746,358 | 7/1973 | Swick, Jr. et al. | 280/36 R |
| 3,946,876 | 3/1976 | Jay | 211/60 R |
| 3,949,528 | 4/1976 | Hartger et al. | 52/79 |
| 3,953,047 | 4/1976 | Morgan | 280/639 |
| 4,085,844 | 4/1978 | Dunchock | 206/335 |
| 4,326,726 | 4/1982 | Dunchock | 280/79.1 A |
| 4,367,880 | 1/1983 | Harding | 280/47.13 R |
| 4,408,795 | 10/1983 | Saitoh et al. | 296/218 |

FOREIGN PATENT DOCUMENTS 914217 12/1962 United Kingdom ............... 296/107

Primary Examiner—Charles A. Marmor
Assistant Examiner—Eric Culbreth
Attorney, Agent, or Firm—Basile and Hanlon

[57] ABSTRACT

A storage rack for storing an automobile top of the type having a roof, opposed sides, an angled rear section, and a sealing member mounted along the rear edge of the rear section. The storage rack includes at least one upright, horizontal member mounted thereto and extending at right angles with respect thereto, a J-shaped seal protecting member adapted to receive the sealing member of the top disposed on the front of the horizontal member and oriented with the foot extending rearwardly, and means disposed on the upright for supporting at least a portion of the rear section of the roof.

3 Claims, 1 Drawing Sheet

STORAGE RACK

REFERENCE TO RELATED APPLICATION

This application is a continuation of application Ser. No. 07/058,254, filed June 4, 1987, now abandoned, which is a continuation-in-part of my application Ser. No. 926,675 filed Nov. 12, 1986, now abandoned.

BACKGROUND OF THE INVENTION

1. Field of the Invention

The present invention relates to the field of storage racks for storing removable automobile tops, and more particularly to a rack capable of storing a removable top of the type which has a sealing member disposed on a rear edge thereof.

2. Description of the Prior Art

An increasingly popular type of automobile is the type which has a removable hard top roof adapted to be releasably secured to the automobile body and removed therefrom to provide the user with a convertible type of vehicle. One known automobile of the type described is manufactured and marketed under the trademark CADILLAC ALLANTE. This automobile has a hard top which includes a roof, opposed sides, an angled rear section and a sealing member mounted along a rear edge of the rear section. It is releasably attachable to the automobile body. The top may be simply removed from the automobile body by the user.

A problem arises when the top is removed from the body in finding a suitable storage method. Commonly, the owners of such vehicles normally place the top in an upright position and generally store the top in the corner of a garage. In response to the storage problem, a number of storage racks have been devised which have proved adequate for storage of the removable tops of various types of automobiles. For example, my U.S. Pat. No. 4,326,726 discloses a storage rack particularly suited for storage of the MERCEDES BENZ ROADSTER removable hard top. However, although the storage rack disclosed in the above-referenced patent is suitable for storing the removable automotive top of the type which has a roof, opposed side windows and an angled rear window, a problem arises if the rack is used to store the removable hard top from the Cadillac Allante. The patented storage rack comprises an angled surface which abuts against a pair of uprights, with the angled member and the uprights together conforming to the angled shape of the roof and rear section of the top. However, no provision is made for receiving a sealing member mounted along the rear edge of the angled rear section. In the embodiment depicted and described in the above-referenced patent, cleats are provided which are disposed along the bottom edge of the angled member. Therefore, placing the removable top from the Cadillac Allante in the storage rack will cause the sealing member to abut the pair of cleats. Furthermore, the weight of the entire automobile top will rest on the sealing member and cause it to become deformed at those locations where it abuts the cleats. Continued use will cause the deformations to become permanent indentations in the sealing member. Hence, when the removable top is mounted on the automobile, a weathertight fit will no longer be obtainable and the occupants of the car will be subjected to undesirable entry of precipitation and cold air into the automobile interior.

It would be desirable to provide a storage rack which is capable of storing a removable automobile top which includes a sealing member disposed on a rear edge thereof without causing deformation or damage to the sealing member.

SUMMARY OF THE INVENTION

The present invention comprises a storage rack for storing an automobile top of the type which has a roof, opposed sides, an angled rear section and a sealing member mounted along a rear edge of the rear section. The rack comprises at least one upright, a horizontal member mounted to the at least one upright which extends at right angles with respect thereto, a J-shaped seal protecting member disposed on the front of the horizontal member which is adapted to receive the sealing member, and means disposed on the upright for supporting at least a portion of the rear section of the roof. The J-shaped member has a stem, base and foot and is oriented so that the foot of the J extends rearwardly.

In a preferred embodiment, the storage rack of the present invention comprises a pair of opposed uprights, a pair of opposed horizontal members corresponding to the pair of opposed uprights and mounted thereto, a J-shaped seal protecting member disposed on each horizontal member, a pair of opposed cross bars interconnecting the horizontal members, and at least one brace interconnecting the pair of uprights. The pair of uprights may further comprise a bent portion disposed at an upper end of the upright and extending horizontally toward the front of the rack. The support means may comprise an angled member which interconnects each of the bent portions and a corresponding one of the pair of horizontal members. Each angled member has a vertical extension formed on an upper end at its point of connection with the bent portion of the uprights which extends upward for a distance. Optionally, casters may be provided for supporting the rack so that it may be rolled along a supporting surface. Also, strips of felt may be adhered to at least a portion of the front surface of each of the pair of angled members and also to an interior surface of each of the J-shaped hooks.

To use the storage rack of the present invention, the removable top is oriented so that the roof is oriented in a vertical plane and faces toward the front of the rack. The sealing member is then inserted into the pair of J-shaped seal protecting members, and the angled rear section is rested upon the angled member of the rack. The roof of the top will then abut against the vertical extensions formed on the angled member. Since the parts of the rack upon which the roof rests are covered with felt strips, the storage rack will not scratch or otherwise damage the surface of the removable top. When the top is in the storage position described herein, it may be safely and securely stored for as long as desired.

BRIEF DESCRIPTION OF THE DRAWING

The various features, advantages and other uses of the present invention described and claimed herein will become more apparent by referring to the following detailed description and drawing in which:

DETAILED DESCRIPTION OF THE PREFERRED EMBODIMENTS

The description herein makes reference to the accompanying drawing wherein like reference numbers refer to like parts throughout the several views.

Figure 1:
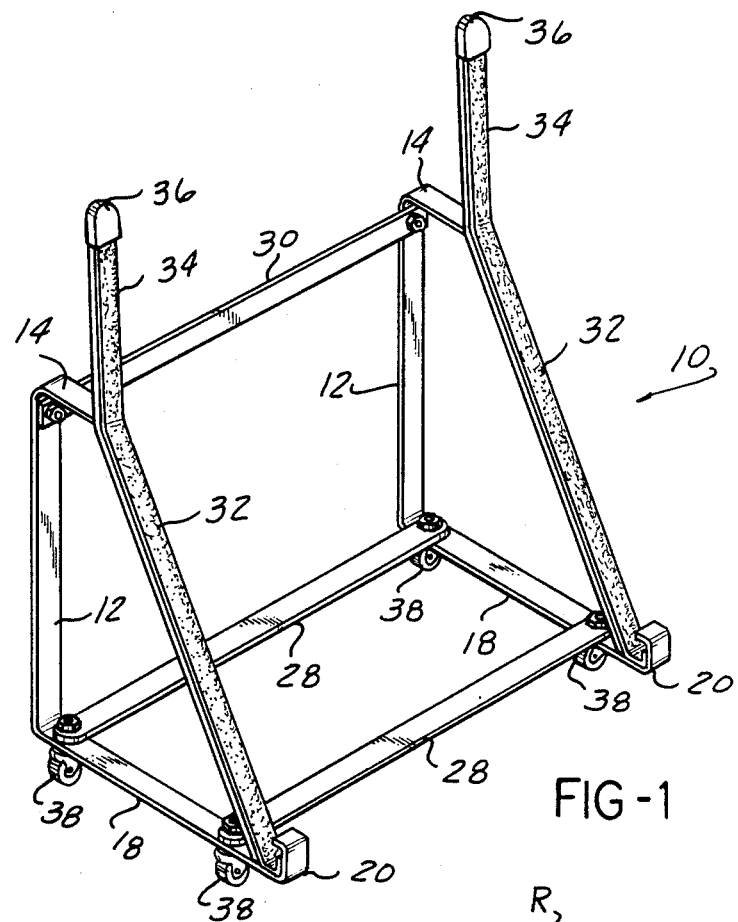
FIG. 1 is a perspective view of one embodiment of the storage rack of the present invention.
Figure 2:
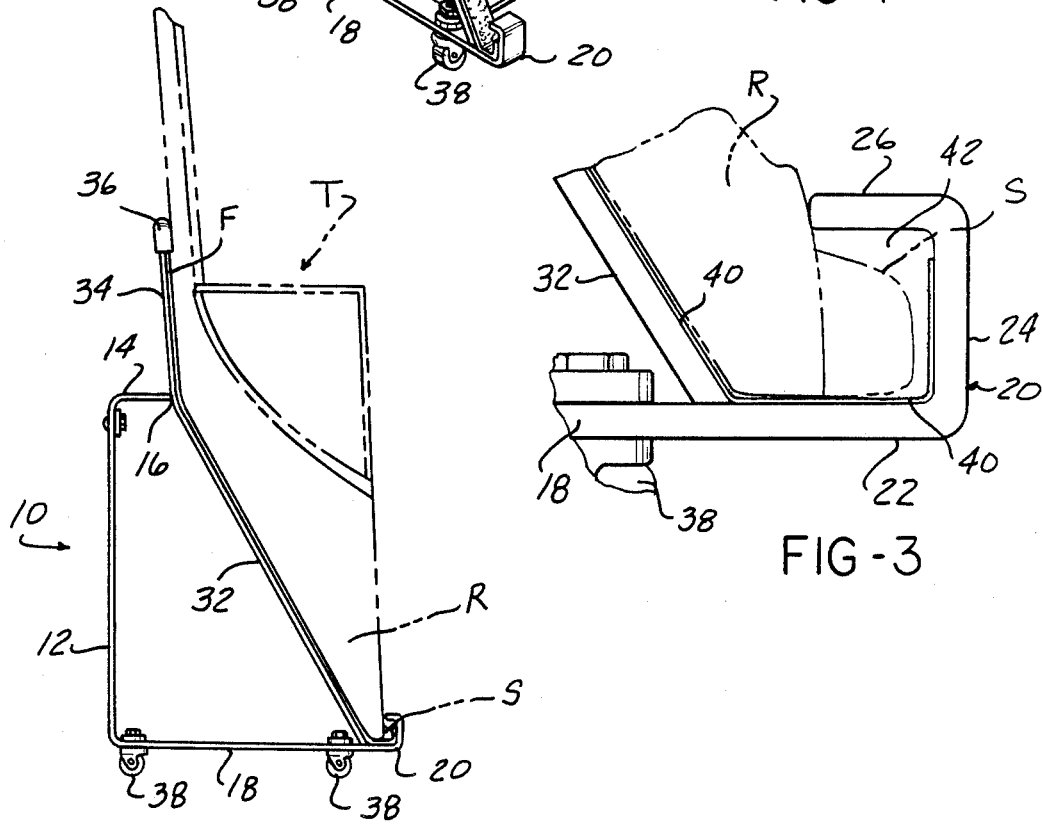
FIG. 2 is a right side view showing a removable automobile roof stored thereon.

Referring now to the drawing and in particular to FIGS. 1 and 2, there is illustrated one embodiment of the present invention in the form of a storage rack 10. The storage rack 10 comprises a pair of planar uprights 12 disposed in parallel and spaced apart relation to each other. Each of the pair of planar uprights 12 includes a bent portion 14 which is disposed on an upper end thereof and extends horizontally to terminate in a free end 16. A pair of parallel and spaced apart horizontal members 18 are provided which correspond to the pair of uprights 12 and are mounted to lower ends thereof. The pair of horizontal members 18 extend at a right angle with respect to the uprights 12. A J-shaped seal protecting member 20 is disposed on a front end of each horizontal member 18. As may be seen in FIG. 3, each J-shaped member 20 has a stem 22, a base 24 and a foot 26. Each J-shaped member 20 is oriented with the foot 26 extending rearwardly. The J-shaped members 20 are adapted to encompass the sealing member S which is disposed on a rear edge of the angled rear section R of a removable automobile top T.

Referring again to FIGS. 1 and 2, a pair of parallel and spaced apart planar cross bars 28 interconnect the horizontal members 18 at front and rear ends thereof. A planar brace 30 interconnects the pair of uprights 12 at points adjacent the bent portions 14 thereof. A pair of opposed planar angled members 32 interconnect the free ends 16 of the pair of uprights 12 and the front ends of the horizontal members 18. Each of the angled members 32 includes a vertical upward extension 34 disposed at the point of interconnection to the free end 16 of the upright 12. Each vertical extension 34 terminates in a free end 36. The angled members 32 are shaped to conform to the rear section R and the roof F of the automobile top T as may be seen with reference to FIG. 2.

In order to enhance the utility of the storage rack 10 of the instant invention, additional structures may be present. A plurality of casters 38 may be provided on the lower face of each horizontal member 18 at its point of interconnection with the planar cross bars 28. The plurality of casters 38 permit the rack to be rolled along a supporting surface such as a garage floor. The brace 30 will form a convenient handle for grasping the rack while it is being moved. Furthermore, strips of felt 40 may be adhered to at least a portion of the front surface of the pair of angled members 32 and to an interior surface of each of the J-shaped seal protecting members 20. The felt strips 40 prevent damage to the automobile top T caused by contact with the surfaces of the storage rack 10.

Figure 3:
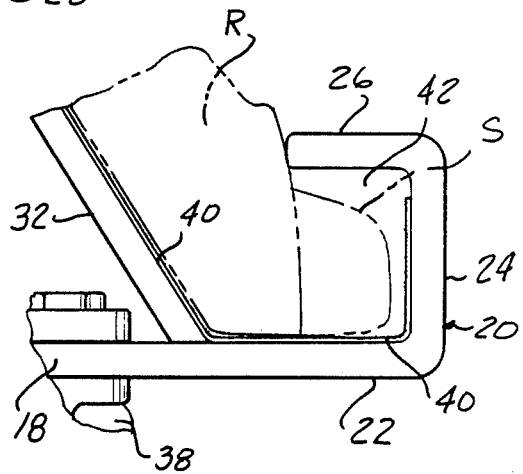
FIG. 3 is a detailed view of the J-shaped seal protecting members of FIG. 2 with the sealing member of the roof disposed therein.

The manner of usage of the storage rack 10 of the present invention may be seen with reference to FIGS. 2 and 3. In FIG. 2, part of the removable top T of an automobile may be seen in phantom as it rests in and is supported by storage rack 10. When in a storage position, the sealing member S of removable top T is disposed in a channel 42 formed by the stem 22, base 24, and foot 26 of each J-shaped member 20. As may be seen in FIG. 3, the channel 42 is large enough to completely contain sealing member S without causing any deformation thereto. Because the angled members 32 are shaped to conform to the shape of the automobile top T, the rear section R of the top T rests on and is supported by the angled sections 32 and the roof F of the top T abuts against the vertical extensions 34. Due to the encompassing of sealing member S in member 42, the abutment of rear section R against the foot 26 of J-shaped channel 20 (as can be seen in FIG. 3), and the abutment of roof F against vertical extension 34, displacement of removable top T with respect to storage cart 10 is effectively prevented. Hence, while the top T may be easily and quickly installed and removed from the storage rack 10, the particular design of storage rack 10 permits safe and secure storage of removable top T without causing damage to sealing member S.

Other arrangements and configurations of the elements of the storage rack disclosed and claimed herein may be apparent to one skilled in the art without departing from the spirit of the inventive concept disclosed herein. For example, while the uprights, horizontal members, and angled members are depicted as paired members in the embodiment illustrated, it is not necessary that a pair of each be provided. If suitably dimensioned, only one of each member need be provided. Furthermore, while the means for supporting at least a portion of the rear section of the roof is depicted in the embodiment illustrated as comprising a pair of angled members with vertical extensions thereon, other suitable shaped support means could be designed. For example, it is not necessary that the pair of angled members be connected to the horizontal members, although it is thought that this design enhances the strength and stability of the storage cart. Furthermore, it is not necessary that the vertical extensions be provided on the upper ends of the angled members. The scope of the invention disclosed and claimed herein is not limited by the embodiments depicted herein, but solely by the claims appended hereto.

What is claimed is:

1. A storage rack for stably supporting a removable rigid automobile top having a roof, a rear portion inclined downwardly from said roof to a lower edge, and a seal mounted on said lower edge; said rack comprising a horizontal lower frame having parallel front and rear frame members interconnected by a pair of spaced opposed side frame members, a pair of upright frame members projecting upwardly from said lower frame adjacent the respective opposite ends of said rear frame member, a pair of upwardly and rearwardly inclined support frame members fixedly secured to the respective side frame members adjacent the forward ends of said side frame members, a pair of rearwardly opening J-shaped seal protecting members having a horizontally extending stem and foot interconnected by a vertically extending base, said stem, foot and base defining a channel, said seal protecting members being fixedly mounted at the respective forward ends of said side frame members in forwardly spaced relationship to said support frame members, said foot abutting said inclined rear portion of said automobile top when said rear portion of said top is supported upon said support frame members, said channel surrounding and spaced from said seal, and means supporting said support frame members upon said upright members at an inclination such that an automobile top supported upon said support frame members with its seal received in said seal protecting members is stably supported upon said rack with said roof projecting substantially vertically upwardly from said rack.

2. The invention defined in claim 1 wherein the lower ends of said support frame members are spaced forwardly from said front frame member and said J-shaped seal protecting members are spaced forwardly from said lower ends of said support frame members.

3. The invention defined in claim 1 further comprising a cross frame member rigidly interconnecting the upper ends of said upright frame members to each other, and said means supporting said support frame members comprises a frame member projecting forwardly from the upper end of each of said upright frame members to support said support frame members in forwardly spaced relationship to said cross frame member.

* * * * *